United States Patent
Lortz et al.

(10) Patent No.: US 6,676,719 B2
(45) Date of Patent: Jan. 13, 2004

(54) AQUEOUS DISPERSION, A PROCESS FOR THE PREPARATION AND THE USE THEREOF

(75) Inventors: Wolfgang Lortz, Waechtersbach (DE); Christoph Batz-Sohn, Hanau-Mittelbuchen (DE); Helmut Mangold, Rodenbach (DE); Gabriele Perlet, Grosskrotzenburg (DE); Werner Will, Gelnhausen (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 10/023,903

(22) Filed: Dec. 21, 2001

(65) Prior Publication Data

US 2002/0134027 A1 Sep. 26, 2002

(30) Foreign Application Priority Data

Dec. 23, 2000 (DE) .......................................... 100 65 027

(51) Int. Cl.$^7$ .............................. C09C 3/00; C09C 3/04; C09G 1/04
(52) U.S. Cl. .............................. 51/308; 106/3; 106/482; 423/335; 423/641; 438/692; 438/693; 424/401; 424/724; 162/181.1; 162/181.6; 501/53; 501/54; 501/55
(58) Field of Search ................................ 51/308; 106/3, 106/482; 423/335, 641; 438/692, 693; 424/401, 724; 162/181.1, 181.6; 501/55, 54, 53

(56) References Cited

U.S. PATENT DOCUMENTS

| 5,967,964 | A | 10/1999 | Hattori et al. |
| 6,328,944 | B1 * | 12/2001 | Mangold et al. ............ 423/278 |
| 2001/0042493 | A1 | 11/2001 | Scharfe et al. |

FOREIGN PATENT DOCUMENTS

| CH | 536 259 | | 4/1973 |
| DE | 196 50 500 | | 6/1998 |
| EP | 0 773 270 | | 5/1997 |
| EP | 0 850 876 | | 7/1998 |
| EP | 0 876 841 | | 11/1998 |
| EP | 1 148 026 | | 10/2001 |
| FR | 2.094.790 | | 2/1972 |
| GB | 2 063 695 | | 6/1981 |
| JP | 10167717 | * | 6/1998 |
| WO | WO 00/17282 | | 3/2000 |

* cited by examiner

Primary Examiner—Michael Marcheschi
(74) Attorney, Agent, or Firm—Oblon, Spivak, McClelland, Maier & Neustadt, P.C.

(57) ABSTRACT

A pyrogenic process is used to prepare alkali-doped silica particles. Particles produced by this process exhibit homogeneous doping, reduced agglomeration, greater stability and higher removal rates. Aqueous dispersions containing alkali-doped pyrogenic silica with average particle size less than 100 nm are used for polishing surfaces (CMP).

13 Claims, 2 Drawing Sheets

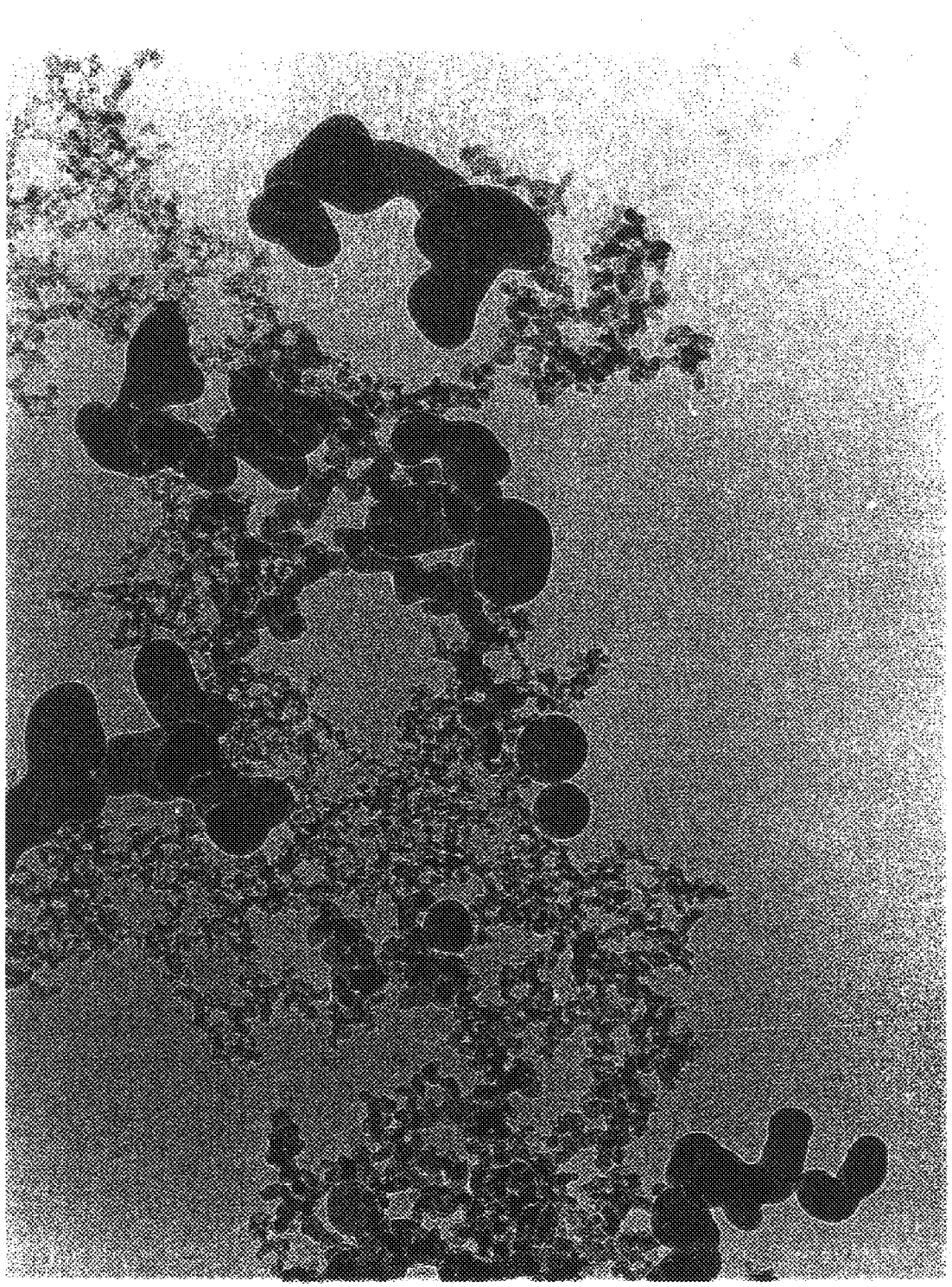
Figure 1: Electron micrograph of undoped silica powder (magnification 1:200 000)

Figure 2: Electron micrograph of potassium-doped silica powder (magnification 1:200 000)

AQUEOUS DISPERSION, A PROCESS FOR THE PREPARATION AND THE USE THEREOF

BACKGROUND OF THE INVENTION

1. FIELD OF THE INVENTION

The invention relates to the preparation of aqueous dispersions containing silica produced by pyrogenic means. A process for the preparation and the use of the dispersions for polishing semi-conductor substrates is included in the invention.

2. DISCUSSION OF THE RELATED ART

Aqueous dispersions containing silica have a broad field of application. The applications include, for example, the coating of paper, the manufacture of glass fibers and quartz glass, and the chemical-mechanical polishing of semi-conductor substrates (CMP process).

Conventional dispersions are based either on colloidal silica, silica sols, or silica produced by pyrogenic means.

Colloidal silica is produced from solutions of sodium silicate and yields dispersions with a very small particle size and very good dispersion stability. A disadvantage, particularly when polishing semi-conductor substrates, is the amount of impurities introduced by the starting material sodium silicate, and the adhesion of the particles to polished surfaces.

Pyrogenic silica, on the other hand, produced by flame oxidation or flame hydrolysis from silicon tetrachloride, hydrogen and oxygen, exhibits a very high purity and a primary particle size comparable with that of colloidal silica. The primary particles aggregate and agglomerate, however, producing hard particles. Dispersion of the aggregates and agglomerates proves to be difficult, the dispersions are less stable and are susceptible to sedimentation or gelling.

A possibility of increasing the stability of the dispersion is described in U.S. Pat. Nos. 5,116,535 and 5,246,624. A particular feature is the BET surface which should be no greater than 75 $m^2/g$, preferably from 30 to 60 $m^2/g$. Here, too, however, as described in U.S. Pat. No. 5,904,159, only a slightly better stability can be expected. Sedimentation occurs after only two months.

U.S. Pat. No. 5,904,159 describes an aqueous dispersion containing silica produced by pyrogenic means which has improved stability. This is achieved by a particular form of dispersion process. The use of a high-pressure homogenizer permits the preparation of aqueous silica dispersions with average particle diameters from 30 nm to 100 nm which are claimed to be stable for several months without sedimentation occurring.

A similar form of dispersion process is also described in EP-A-876 841. The average particle size of the claimed metal oxides produced by pyrogenic means is given here as 10 nm to 2 $\mu$m and the stability is given in the examples as at least 30 days.

This dispersion process its also claimed in WO 00/17282 A1 for silica, cerium oxide and zirconium oxide, with particle sizes from 30 nm to 500 nm. No indications about the stability of the dispersion are given.

Despite this improved stability of the aqueous dispersions, the reagglomeration behavior of the dispersed silica particles remains, limiting the stability of the dispersion and leading to scratches when surfaces are polished in the CMP process.

SUMMARY OF THE INVENTION

The object of the present invention is to provide an aqueous dispersion which contains silica produced by pyrogenic means which exhibits a markedly reduced reagglomeration behavior, greater stability and which, during chemical-mechanical polishing, yields high removal rates and leads to a surface which is very largely free from microscratches.

It is a further object of the invention to provide a process of preparing the silica dispersions of the invention.

It is another object of the invention to utilize the silica dispersions of the invention for planarizing semiconductor surfaces or as coatings or fillers.

BRIEF DESCRIPTION OF THE INVENTION

The technical object is achieved by an aqueous dispersion containing an alkali-doped pyrogenic silica prepared by means of aerosol, where the dispersion contains silica having an average particle diameter of secondary particles of less than 100 nm and the quotient $d_n/d_a$ of the arithmetic mean of the number distribution $d_n$ and the arithmetic mean of the surface distribution $d_a$ of the primary particles is at least 0.7.

The terms primary and secondary particles originate from the pyrogenic production of the alkali-doped silica. In a pyrogenic process for the production of doped and undoped silica, the so-called primary particles initially have a size which is dependent on the reaction parameters selected and which is approximately from 5 nm to 40 nm. The size of the primary particles may be determined, for example, by TEM pictures. The primary particles are not, however, present in the isolated form but intergrow to aggregates, or join together to form agglomerates which are described hereinafter as secondary particles.

The quotient $d_n/d_a$ in the alkali-doped silicas of at least 0.7 describes a markedly narrower particle size distribution than in an undoped silica produced by pyrogenic means.

The quotient $d_n/d_a$ in a silica produced by pyrogenic means with a BET surface of 130 $m^2/g$ (Aerosil 130, Degussa AG) is 0.52.

This dispersion has greater stability than dispersions prepared without alkali oxide doping. Greater stability of the doped dispersion means that the time at which the dispersion increases in viscosity, geling or settling of the silica occurs later than in dispersions with undoped silica.

It also became apparent that the time for an even distribution of the alkali-doped silica produced by pyrogenic means is shorter than without doping.

This result is surprising because aqueous dispersions containing silica produced by pyrogenic means may be stabilized anyway, according to the prior art, by the addition of KOH or another basic substance.

Potassium-doped silica has a modified aggregate or agglomerate structure compared with undoped silica. The doping substance is homogeneously incorporated, in the pyrogenically prepared alkali-doped silicas of the invention. In contrast to mixtures of undoped silica and alkali, where the alkali is present on the exterior of the silica particles, the alkali-doped silica particles of the invention contain alkali both inside and on the exterior of the particles. For this reason, a dispersion which contains alkali-doped silica and alkali differs clearly from one which contains undoped silica and alkali. In the case of alkali-doped silica, this different structure leads to more rapid incorporation, a lower reagglomeration tendency, and hence to greater stability of the aqueous dispersions.

In the case of silica produced by pyrogenic means and doped by means of aerosol, the doping component is fed into the flame, of the kind used in the known way for the production of pyrogenic oxides by flame hydrolysis, in the form of an aerosol, for example, in the form of an aqueous solution of alkali chlorides. This process is described in DE-A-196 50 500 (incorporated herein by reference). The aerosol is mixed homogeneously prior to the reaction with the gas mixture of flame oxidation or flame hydrolysis, silicon tetrachloride, hydrogen and oxygen. The aerosol-gas mixture is allowed to react in a flame and the resulting doped silica produced by pyrogenic means is separated from the gas stream in the known way. The starting product of the aerosol is a salt solution or suspension containing the component of the doping substance. During the formation of the pyrogenic oxide, the doping medium is in the fine-particle form in the gas phase, so that homogeneous incorporation of the doping component in the silica produced by pyrogenic means is possible. Consequently, the aggregate or agglomerate structure of the pyrogenic silica is also influenced.

The degree of doping may be varied widely in the silica prepared by the above process, from 0.00001 wt. % to 20 wt. %. In the use for the preparation of an aqueous dispersion according to the present invention, the degree of doping is preferably from 10 ppm to 10 wt. %, particularly preferably in the range from 300 ppm to 2 wt. %.

The BET surface of the alkali-doped silica in a preferred embodiment of the invention is from 5 to 600 m$^2$/g. A range from 50 to 400 m$^2$/g is particularly preferred, in which the dispersion exhibits good stability and the preparation of the alkali-doped silica is technically simple to carry out.

The solids content of the dispersion containing alkali-doped silica depends primarily on the intended use. In order to save on transport costs a dispersion with the highest possible solids content is desirable, whereas for certain applications, such as, for example, for polishing silicon wafers, dispersions with low solids contents are used. The range from 0.1 wt. % to 70 wt. % is preferred according to the invention, the range from 1 wt. % to 30 wt. % being particularly preferred. In these ranges, the alkali-doped dispersion shows good stability.

Due to the fact that the silica is doped with alkali, the pH of the dispersion is higher than in an undoped one, from about 5 to 8 depending on the degree of doping (pH of a four percent dispersion). The dispersion may be used such as it is, for example, for polishing. As in the case of dispersions containing undoped silica, however, the viscosity in this case is markedly increased in a pH range from acid to slightly alkaline. According to a preferred embodiment of the invention, the pH of the dispersion is adjusted to a value from 8 to 12 by adding alkali hydroxides or amines, potassium hydroxide and ammonia or ammonium hydroxide being particularly preferred. This leads to a marked stabilization of the dispersion, and condensation reactions of the silica are thereby avoided.

According to DE-A-196 50 500, all alkali metals are suitable for doping silica produced by flame oxidation or flame hydrolysis. Doping with potassium is, however, particularly preferred. When potassium salts are used as the doping component, the structure alters decisively, that is, the degree of intergrowth and also the morphology (that is, the appearance) of the primary particles. In potassium doped silica, this change in morphology starts at a potassium content of more than 300 ppm.

Surprisingly, the pyrogenic oxides doped in this way with potassium exhibit spherical round primary particles with only very little intergrowth in the electron micrograph, which also manifests itself in the fact that no end point is detectable when the structure is determined by the dibutyl phthalate method (DBH method). The potassium is uniformly distributed in the doped pyrogenic oxides. This cannot be seen on the electron micrographs.

FIG. 1 shows an electron micrograph of a silica produced by pyrogenic means without doping (Aerosil 130, Degussa).

FIG. 2 shows an electron micrograph of a silica produced by pyrogenic means and doped with 0.44 wt. % potassium, with a specific surface (BET) of 131 g/m$^2$.

The invention also provides a process for the preparation of the dispersion containing alkali-doped silica. Dispersion methods suitable for this purpose are those in which a sufficiently high energy input permits dispersion of even very hard and highly aggregated materials. These include systems operating on the rotor-stator principle, fox example, Ultra-Turrax machines or agitated ball mills. Higher energy input is possible with a planetary kneader/mixer. The effectiveness of this system is associated, however, with a sufficiently high viscosity of the treated mixture in order to introduce the requisite high shear energies for breaking down the particles.

When doped oxide particles are ground and dispersed, there is a risk that the dopant will become detached during grinding and dispersion. If the dispersion is to be used in the CMP process as a polishing agent, this leads to uneven polishing results.

It has now been found that aqueous dispersions containing alkali-doped silica particles which are smaller than 100 nm and in which the dopant does not become detached may be obtained with high-pressure homogenizers, hereinafter also called wet-jet-mill.

In these devices, two pre-dispersed streams of suspension under a pressure of up to 3500 kg/cm$^2$ are depressurized by means of a nozzle. Both dispersion jets strike each other exactly and the particles grind themselves. In another embodiment, the pre-dispersion is likewise placed under high pressure, but the collision of the particles takes place against armour-plated wall regions.

These devices have been used hitherto only for the dispersion of undoped oxides such as zinc oxide, silica, aluminium oxide (UK-A-2 063 695, EPA-876 841, EP-A-773 270, WO 00/17282 Al). The grinding and dispersion of doped oxides with these devices has not been described.

The invention also provides the use of the aqueous dispersion of alkali-doped silica for planarizing semiconductor substrates or layers applied thereto. A microscratch-free surface may be obtained with the dispersion of alkali-doped silica with a high rate of polishing. Moreover, said dispersions are suitable for the preparation of very fine-particle surface coatings in the paper sector, or as a raw material in the cosmetics and glass sector.

German application 10065 027.9, filed on Dec. 23, 2000 is incorporated herein by reference.

Where ranges are provided herein, all values and subranges between and including the stated values are included.

EXAMPLE

Methods of Analysis

The particle size distribution $d_n/d_a$, of the primary particles in the solid was determined by counting the particles from the electron micrographs.

The average secondary particle size in the dispersion was determined with the Zetasizer 3000 Hsa from Malvern.

The surface of the powders used was determined by the method of S. Brunauer, P. H. Emmet and I. Teller, J. Am.

Chemical Society, volume 60, page 309 (1938) incorporated herein by reference, and is generally known as the BET surface.

The viscosity of the dispersions produced was determined with a rotational rheometer from Physica Model MCR 300 and the CC 27 cup. The viscosity value was determined at a shear rate of 500 1/sec. This shear rate lies in a range in which the viscosity is practically independent of the shear stress.

The sediment formation was assessed by a visual assessment in a 1000 ml wide-mouth polyethylene bottle after a standing time of one week. Any sediment present may readily be detected by carefully tilting the bottle.

The synthesis of the potassium-doped silica particles was carried out in accordance with DE-A-196-50 500.
Preparation of Potassium-doped Silica (K Content 0.44 wt. %, as $K_2O$)

4.44 kg/h of $SiCl_4$ were evaporated at about 130° C. and transferred to the central tube of the burner of known design in accordance with DE 196 50 500 A1. In addition, 4.7 $Nm^3/h$ of hydrogen and 3.7 $Nm^3/h$ of primary air and 1.15 $Nm^3/h$ of oxygen were fed into this tube. This gas mixture flowed out of the inner burner jet and burned in the burner space of the water-cooled flame tube.

In order to prevent caking, an additional 0.5 $Nm^3/h$ of (secondary) hydrogen and 0.3 $Nm^3/h$ of nitrogen were fed into the jacket jet surrounding the central jet.

About 10 $Nm^3/h$ of air were also drawn in from the, surroundings into the flame tube which was under a pressure slightly below atmospheric. (Open burner method.)

The second gas component, which was introduced into the axial tube, consisted of an aerosol generated from a 12.55 percent aqueous potassium chloride solution. Two two-component nozzles yielding an atomization capacity of 255 g/h of aerosol acted as the aerosol generator. This aqueous salt aerosol was passed through externally heated lines by means of 2 $Nm^3/h$ of carrier air and left the inner nozzle at an outlet temperature of about 180° C. The aerosol was introduced into the flame.

After flame hydrolysis, the reaction gases and the resulting potassium-doped silica were drawn through a cooling system in a known manner by applying a pressure below atmospheric, and in so doing the particle/gas stream was cooled to about 100° C. to 160° C. The solids were separated from the waste gas stream in a filter or cyclone.

The potassium-doped silica was obtained in the form of a white, fine-particle powder. In a further step, hydrochloric acid residues still adhering were removed at elevated temperature by treatment with air containing water vapor.

The analytical data of the potassium-doped silicas prepared in this way are reproduced in Table 1.

TABLE 1

Analytical data of the potassium-doped silicas

| No. | BET $m^2/g$ | Potassium content wt. % (as $K_2O$) | Primary particle size distribution $d_n/d_a$ |
|---|---|---|---|
| 1 | 131 | 0.44 | 0.84 |
| 2 | 121 | 0.49 | 0.81 |
| 3 | 104 | 0.12 | 0.78 |
| 4 | 113 | 0.24 | 0.80 |
| 5 | 120 | 0.69 | 0.86 |
| 6 | 117 | 1.18 | 0.84 |

Preparation of Dispersions
Method A 36 kg of deionized water and 104 g of 30% KOH solution were placed in a 60 l refined steel preparation vessel. Using a dispersion and suction mixer from Ystral (at 4500 rpm), 16.5 kg of the silica doped with 0.44 wt. % potassium as prepared above and were drawn in by suction and roughly predispersed. This predispersion was supported by a Z 66 type rotor/stator continuous-flow homogenizer from Ystral with four processing rings, a stator slot width of 1 mm and a speed of 3000 rpm. After the introduction of the powder, dispersion was completed with the Z 66 type rotor/stator continuous-flow homogenizer from Ystral at a speed of 11,500 rpm. During this 15 minute dispersion at 11,500, the pH was adjusted to and kept at pH 10.5 by adding more KOH solution. A further 779 g of KOH solution were used in so doing and a solids concentration of 30 wt. % was obtained by adding 1.5 kg of water.

Instead of the potassium-doped silica, dispersion was also carried out according to method A for Aerosil 130 (BET surface 130 $m^2/g$) from Degussa.
Method B About half of the dispersions obtained by method A were ground with a wet-jet-mill, Ultimaizer System from Sugino Machine Ltd., HJP-25050 model, at a pressure of 250 MPa and with a diamond jet diameter of 0.3 mm and two mill passes.

In total, three dispersions were prepared for polishing purposes:

Dispersion 1: silica doped with 0.44 wt. % potassium, dispersed by method B; solids content 30 wt. %, pH 10.5.

Dispersion 2: silica doped with 0.44 wt. % potassium, dispersed by method A; solids content 30 wt. % pH 10.5.

Dispersion 3: Aerosil 130, Degussa AG, without K-doping; dispersed by method B; solids content 30 wt. %, pH 10.5.

Dispersion 2, prepared by method A, exhibited a markedly higher viscosity and the formation of sediment compared with dispersions 1 and 3 which were prepared by method B.

Further analytical data on these dispersions are given in Table 2.

TABLE 2

Analytical data of dispersions 1 to 3

| Disp. | Arithmetic means of secondary particle diameters in the dispersion Number [nm] | Volume [nm] | Viscosity[1] [mPas] | Sediment |
|---|---|---|---|---|
| 1 | 49 | 71 | 7.5 | no |
| 2 | 77 | 142 | 50 | yes |
| 3 | 100 | 140 | 15 | no |

[1]at 500 1/sec

The particle size distribution of the primary particles does not alter due to dispersion.

Incorporation in dispersion/wettability: Considerable differences in handling became apparent during the incorporation of potassium-doped silica and Aerosil 130. The potassium-doped material could be incorporated within 1.5 h using the dispersion and suction mixer from Ystral. A period of 2.5 h was required to incorporate the amount of Aerosil 130.

Moreover, it was not possible to predisperse the entire amount of Aerosil 130 only with the Z 66 type rotor/stator continuous-flow homogenizer from Ystral. From a concentration of about 20 wt. %, it was no longer possible to draw in Aerosil 130 by suction due to the high viscosity caused by partial reagglomeration. This behavior was markedly less pronounced with potassium-doped silica dispersions. Only when supported by the wet-jet-mill at 75 Mpa operated with recycling could the viscosity be reduced again to such an extent that further Aerosil 130 material could be incorporated.

The different rate of incorporation may possibly be attributable to a different wetting behavior.

To this end, an amount of 5–10 mg of the appropriate sample was placed carefully on the surface of a test tube filled with twice-distilled water to a height of 6 cm, care being taken to ensure that there was no contact between the sample substance and the glass wall of the vessel. In order to determine the rate of wetting, the time taken for the sample to sink completely was measured. The test was repeated three times in each case.

It was observed that all the samples became thoroughly wetted immediately after being placed on the surface of the water. Complete wetting is considered to be the time taken for the sample to come into contact with water to such an extent that it becomes detached from the surface of the water and sinks to the bottom.

The wetting times of potassium-doped silica vary with the potassium doping. They are substantially shorter than for undoped silica (Aerosil 130) (Table 3).

TABLE 3

Wetting times of potassium-doped silica[1]

| wt. % K (as $K_2O$) | 0.12 | 0.24 | 0.44 | 0.69 | 1.18 | 0[2] |
|---|---|---|---|---|---|---|
| Wetting time (s) | 31 | 31 | 39 | 39 | 43 | 120 |

[1]Mean of 3 measurements; [2]Aerosil 130

Polishing Process
Dispersions Used

Apart from dispersions 1 to 3, the following commercially available dispersions that do not contain alkali doped silica were also used for polishing:

Klebosol 30N50 (Rodel), solids content 30 wt. %, stabilized, with ammonia, pH 9.5

Klebosol 1501 (Rodel), solids content 30 wt. %, stabilized with KOH, pH 10.9.

Semi-Sperse 25 (Cabot Microelectronics), solids content 25 wt. %, KOH-stabilized, pH 11.0, diluted 1:1 with water.

Apparatus

A P200 CMP cluster tool from Peter Wolters CMP System, fitted with a PM200 polishing machine and a brush cleaner from Contrade was used for the polishing tests. Cleaning tests were carried out with water and with ammonia.

The polishing head was fitted with a DF200 backing film from Rodel, and the polishing cloth used was an IC1000/ SubaIV pad, also from Rodel. The set of parameters listed in Table 4 was used for the polishing process.

TABLE 4

Set of parameters for the polishing process[1]

| Force | 1500 N |
|---|---|
| Contact point[2] | 190 mm |
| Back surface pressure, internal[3] | 0 kPa |
| Back surface pressure, external[3] | 10 kPa |
| Oscillation | −10 mm |
| Chuck speed | 20 rpm |
| Polishing disc speed | 33 rpm |

TABLE 4-continued

Set of parameters for the polishing process[1]

| Dispersion flow rate | 180 ml/min |
|---|---|
| Polishing time | 60 sec |

[1]Temperatures about 25° C.;
[2]The distance, in nm, between the center of the chuck and the center of the polishing disc (diameter of polishing disc 600 mm);
[3]a two-zone chuck was used where, to improve the uniformity adjustment, two regions can be treated separately with back surface pressure:

Wafers 200 mm Si wafers coated with 1000 nm LPCVD TEOS (670° C., 750 mTorr).

Evaluation of the Polishing Results
Rate of Removal and Non-uniformity the rates of removal obtained with the dispersions and the non-uniformity were determined by measuring the film thickness with an Axiospeed spectrophotometer from Zeiss. 49-point measurements were performed on the wafer with a 6 mm edge exclusion zone in each case. 25 wafers in each case were polished and evaluated in order to determine the average rate removal.

In view of the pronounced gelling behavior on the polishing disc, it was not possible to achieve a stable polishing process capable of evaluation with dispersion 2.

Only three wafers could be polished, the rate of removal being below that of dispersions 1 and 3.

The results are set out in Table 5.

TABLE 5

Polishing results, 49-point measurement[1]

|  | Disp. 1 | Disp. 3 | Klebosol 30N50 | Klebosol 1501 | SS 25[2] |
|---|---|---|---|---|---|
| Removal (nm/min) | 445 | 355 | 287 | 326 | 353 |
| Non-uniformity[3] % | 5.5 | 6.7 | 5.7 | 6.2 | 5.9 |
| Particle number after post-CMP[4] | 181 | 176 | 171 | 178 | 176 |

[1]Edge exclusion zone 6 mm; [2]Diluted 1:1 with water; [3]Standard deviation sigma;
[4]Particle size 0.25–1.00 μm; Brushclean with 2.0% ammonia Defects The examinations in respect of defects (scratches and particles) were carried out visually under a Haze lamp and with a Censor ANS 100 surface particle counter respectively.

The determination of the surface particles after post-CMP cleaning gives similar values for all the dispersions examined (Table 5).

The potassium-doped silica dispersion prepared by the wet-jet-mill with an average particle size of less than 100 nm exhibits advantages during polishing in terms of the rate of removal and non-uniformity compared with dispersions based on colloidal silica Klebosol 30N50 and 1501, and compared with the SS25 dispersion based on pyrogenic silica. With regard to the defects brought about on the surface of the wafers during polishing, the behavior of the above-mentioned dispersions is almost equally good.

Obviously, numerous modifications and variations of the present invention are possible in light of the above teachings. It is therefore to be understood that within the scope of the appended claims, the invention may be practiced otherwise than as specifically described herein.

What is claimed is:

1. An aqueous dispersion of an alkali-doped silica, comprising:
   an aqueous dispersion of particles of alkali-doped silica having a particle size less than 100 nm from which the alkali dopant does not become mechanically detached as the dispersion is prepared in a high pressure homogenizer, said alkali-doped silica having been produced pyrogenically while being doped with an alkali containing aerosol, said silica comprising secondary particles having an average particle diameter of less than 100 nm and primary particles having a ratio $d_n/d_a$ of an arithmetic mean of a number distribution $d_n$ and an arithmetic mean of a surface distribution $d_a$ of at least 0.7.

2. The aqueous dispersion according to claim 1, wherein the alkali content of the doped silica ranges from 10 ppm to 10 wt %.

3. The aqueous dispersion according to claim 1, wherein said alkali-doped silica has a BET surface area ranging from 5 to 600 m$^2$/g.

4. The aqueous dispersion according to claim 1, wherein said alkali-doped silica has a solids content ranging from 0.1 wt % to 70 wt %.

5. The aqueous dispersion according to claim 1, wherein the dispersion has a pH ranging from 8 to 12.

6. The aqueous dispersion according to claim 1, wherein said dopant is potassium.

7. A process for preparing the aqueous dispersion according to claim 1, comprising:
   dispersing the alkali doped silica in an aqueous solution.

8. The process as claimed in claim 7, wherein the silica is dispersed in an aqueous solution by vigorous mixing.

9. The process as claimed in claim 7, wherein the silica is dispersed in an aqueous solution with a planetary kneader/mixer.

10. The process as claimed in claim 7, further comprising:
    pressurizing the alkali-doped silica under a pressure ranging up to 3500 Kg/cm$^3$,
    pressurizing an aqueous solvent under a pressure ranging up to 3500 Kg/cm$^3$,
    depressurizing the alkali-doped silica and the aqueous solvent,
    wherein said depressurized alkali-doped silica and said depressurized aqueous solvent collide with each other or with a wall of a reaction device.

11. A method for planarizing a semiconductor substrate or one or more layers applied thereto, comprising:
    polishing said substrate or said one or more layers with the aqueous dispersion claimed in claim 1.

12. A paper having a surface coating produced with the aqueous dispersion claimed in claim 1.

13. A cosmetic filler or glass component produced with the aqueous dispersion as claimed in claim 1.

* * * * *